US006645419B2

(12) United States Patent
Wrigley

(10) Patent No.: US 6,645,419 B2
(45) Date of Patent: Nov. 11, 2003

(54) DISPENSER

(75) Inventor: Andrew Nicholson Wrigley, Glen Eden (NZ)

(73) Assignee: ITW New Zealand Limited, Avondale (NZ)

(*) Notice: Subject to any disclaimer, the term of this patent is extended or adjusted under 35 U.S.C. 154(b) by 150 days.

(21) Appl. No.: 09/939,607

(22) Filed: Aug. 28, 2001

(65) Prior Publication Data

US 2002/0023933 A1 Feb. 28, 2002

Related U.S. Application Data

(62) Division of application No. 09/357,172, filed on Jul. 19, 1999, now Pat. No. 6,305,575.

(30) Foreign Application Priority Data

Jul. 20, 1998 (NZ) ............................................. 331026

(51) Int. Cl.[7] ............................................. B29C 49/00
(52) U.S. Cl. ....................................... 264/500; 264/523
(58) Field of Search ................................. 264/500, 523

(56) References Cited

U.S. PATENT DOCUMENTS 3,628,705 A 12/1971 Rieke
4,732,303 A 3/1988 Wang
4,771,916 A 9/1988 Mitchell
4,798,605 A 1/1989 Steiner et al.
5,111,970 A 5/1992 Rutter et al.
5,228,592 A 7/1993 Pellerano
5,375,769 A * 12/1994 Schultz ....................... 239/310
5,960,992 A 10/1999 Bernstein et al.
6,053,360 A 4/2000 Rutter
6,224,817 B1 * 5/2001 Villers ........................ 264/503

FOREIGN PATENT DOCUMENTS

| | | |
|---|---|---|
| NZ | 283239 | 3/1997 |
| WO | 8102418 | 9/1981 |

* cited by examiner

*Primary Examiner*—Suzanne E. McDowell
(74) *Attorney, Agent, or Firm*—Lowe Hauptman Gilman & Berner LLP

(57) ABSTRACT

The present invention provides a liquid dispenser which is adapted to connect to a container, the container including a membrane seal, wherein the dispenser is movable between two configurations being an unopened configuration to an open configuration which opens a liquid channel from the liquid dispenser to the container cap, and which pierces the membrane seal to open a liquid channel from the container through to the dispenser. A method of manufacturing such a dispenser is also disclosed.

17 Claims, 2 Drawing Sheets

DISPENSER

This application is a Divisional of application Ser. No. 09/357,172 filed Jul. 19, 1999, now U.S. Pat. No. 6,305,575.

TECHNICAL FIELD

This invention relates to improvements in liquid dispensing devices. Specifically the present invention may be used to form a dispenser from a single plastic moulding that can pierce a membrane seal and dispense liquid from a container.

BACKGROUND ART

Modern packaging methods allow numerous and varied types of liquid to be sealed within containers. In some instances a removable membrane barrier is provided at the outlet of a container to ensure that liquid cannot be accidentally spilled and to provide a barrier to the atmosphere, which may degrade the contents of the container.

Membrane seals are normally configured so that the user must first remove a covering cap, which protects the membrane during transit or storage on a shop shelf, and then pierce or peel off the membrane. To some users this is a fiddly operation as they must ensure they do not spill any of the liquid on themselves when they apply pressure to the membrane. Some people also find the two stage opening process relatively slow if they need quick access to a fresh container.

The most common form of membrane seal currently used in packaging applications is the induction seal. An induction seal consists of membrane or layer of aluminium foil with backing material applied to the outlet of a container. The induction seal must be applied as an additional step to the container manufacturing process, increasing manufacturing costs and time frames.

In addition, some containers are adapted to hold and dispense relatively viscous liquids. As these liquids flow slowly they are difficult to pour without having the liquid spill on to the sides of the container. In such cases liquid usually cakes up and dries around the outlet of the container, and in the case where the liquid is a food, this is unattractive to and unhygienic for the user.

A dispenser that solved any or all of the above problems would be of advantage over the prior art. Specifically a dispenser which could easily pierce the membrane seal of a container with little effort from the user and which could cleanly dispense viscous liquid would be of advantage over the prior art.

It is an object of the present invention to address the foregoing problems or at least to provide the public with a useful choice.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a liquid dispenser adapted to connect to a container cap, said container cap including a membrane seal, said dispenser being moveable between two configurations, being an unopened configuration to an open configuration which opens a liquid channel through the container cap.

According to another aspect of the present invention there is provided a liquid dispenser substantially as described above wherein the dispenser includes a spout to provide a portion of a liquid channel within said dispenser, said spout being pivotably moveable between two positions to position the dispenser in either an unopened or opened configuration.

According to yet another aspect of the present invention there is provided a dispenser substantially as described above wherein the dispenser includes a claw adapted to rupture the membrane seal of the cap when the dispenser is attached to the container cap and moved from an unopened to an open configuration.

A container as discussed throughout the specification may be any type to packaging that allows a liquid to be contained and held within same. For example, a container may consist of an internally "waterproofed" cardboard carton, or a bottle formed from plastic, glass or other similar materials.

In a preferred embodiment the liquid which the container may contain and which is dispensed may be a food sauce. Such sauces are usually relatively viscous and need to be sealed away from the atmosphere to prevent the sauce from degrading. These two characteristics of food sauces present particular difficulties in the design and implementation of containers and dispensers for same.

The term relatively viscous discussed above may be defined as being any material that is more viscous than water. The present invention may be adapted to dispense liquids such as food sauces that have a viscosity greater than that of water.

However, in alternative embodiments the liquid dispensed may not be a food sauce. Those skilled in the art should appreciate that any type of liquid may be dispensed using the present invention and reference to its use with food sauces only throughout the specification should in no way be seen as limiting.

Preferably a dispenser is adapted to connect to a container cap. Such a connection may be substantially "waterproof" to ensure that any liquid that flows between the two elements cannot leak out between the connection points or areas.

Preferably the present invention is adapted for use with a container cap which includes a membrane seal. Such a cap and membrane seal may be adapted to cover the outlet to a container to prevent spillage of its contents during transportation and from exposure to the atmosphere ruining the contents of the container. In some instances the container cap and membrane seal may also provide a tamper evident means to indicate if a container has been interfered or tampered with before purchase by a consumer.

A membrane seal as discussed throughout this specification may also be defined as any element or component which may be applied over an aperture or opening within a container to seal in the contents of the container. Preferably such a membrane seal may be in the form of the induction seal discussed previously but those skilled in the art should appreciate that other types of membrane seal may be used in conjunction with the present invention.

In a preferred embodiment the present invention may be adapted to facilitate the dispensing of liquid from a container via a liquid channel. This liquid channel may be open or closed depending on the particular position or configuration of the dispenser. Such a liquid channel may be defined as including an outlet from a container, sections of the container cap through which liquid can flow, the membrane seal of a container cap and portions of the dispenser through which liquid may also flow in a controlled manner. The dispenser may be configured so as to engage with the container cap and to form a portion of a liquid channel through which liquid may be dispensed. Those skilled in the art should appreciate that the container cap and dispenser may be used to provide a water tight liquid channel from the outlet of the container.

In a preferred embodiment the cap may be clipped or screwed on to an attachment of the container to place the membrane seal over the outlet of the container. Alternatively, the cap may be glued onto the container or formed as an integral part of same. As can be appreciated by those skilled in the art the container cap and membrane seal may have many different forms and configurations depending on a particular application and embodiment in which the present invention is applied.

For example in one alternative embodiment the container cap may not be configured as a component which is clipped, screwed or otherwise attached to a container. In such an embodiment the container cap may simply be formed as an integral part of the container, and may incorporate a membrane seal to prevent the contents of the container from escaping. Those skilled in the art should appreciate that the present invention may be configured for use with such types of container caps and containers, and reference only to container caps which are attached to containers throughout this specification should in no way be seen as limiting.

Preferably the dispenser is moveable between two positions to provide the dispenser with two configurations. In the first configuration, being the unopened configuration, the dispenser may be moved or positioned so that the portion liquid channel it contains is closed to prevent liquid from flowing from an outlet of the container and through the dispenser. In the second configuration, being the open configuration, the dispenser may be positioned so that it provides a portion of a liquid channel for liquid exiting the container through the dispenser.

In a preferred embodiment the dispenser includes a spout. A spout may in one embodiment be configured as a long hollow tube or pipe with one end protruding from one side of the dispenser and the other end positioned adjacent to the cap membrane when the dispenser is connected to the cap. The end of the spout closest to the container cap may be defined as the spout inlet, whereas the end of the spout remote from the container cap may be defined as the dispenser or spout outlet.

In this way the spout may provide at least a portion of a liquid channel within the dispenser, allowing liquid from a container to be dispensed in a relatively controlled manner. The entire liquid channel may be formed in this embodiment by the spout, and the internal area of the dispenser adjacent to the container cap membrane seal, and the container cap itself connected to an outlet of the container.

In a preferred embodiment the dispenser spout is connected to a body section of the dispenser by a flexible hinge element. Such a hinge element may be formed from a relatively thin layer of malleable plastic that can sit easily in one of either of two positions. Use of such a hinge element to connect the spout into the dispenser allows the spout to be pivoted between two positions to position the dispenser in either an unopened or a open configuration.

In a preferred embodiment the hinge element may be used to move the spout from its unopened position to it open position. In such an embodiment the cap membrane seal may seal the container when the spout is in the unopened position, and as the spout is pivoted into the open position, the end of the spout or a portion thereof adjacent to the membrane seal may rupture the seal, opening a liquid channel from the container out through to the outlet end of the spout. In such an embodiment the dispenser spout will usually be pivoted from its unopened to open position and remain in the same position until the container is emptied of its contents.

In another embodiment the spout may be pivoted by use of the hinge to lie substantially parallel with the body of the dispenser and to open the dispenser's portion of the liquid channel. The hinge may then be used to pivot the spout to a position substantially perpendicular to the body of the dispenser, with the hinge also pivoting to substantially cover the inlet of the spout, thereby closing the dispenser's liquid channel.

In yet another alternative embodiment the spout and dispenser may be configured substantially as described above with the exception that the spout may be positioned substantially parallel with the body of the dispenser to close the dispenser's portion of the liquid channel. To open the dispenser this liquid channel spout may in this embodiment be placed in a position substantially perpendicular to the body of the dispenser in its open configuration.

In a preferred embodiment the dispenser may include a claw. A claw may preferably be formed on the end of the spout adjacent to the cap membrane when the dispenser is connected to the cap. Such a claw may include a plurality of projections or teeth that depend from one end or face of the spout. These projections may be configured so that if the spout is moved from the unopened position to the open position, the claw teeth will be forced against the cap membrane and may rupture same and push it away from the flow of liquid through the cap and spout. In such an embodiment the claw teeth may hold the ruptured membrane to one side of the spout allowing liquid to flow substantially through the center of the spout without any interference from the ruptured membrane.

In such an embodiment the inlet end of the spout may be formed with an inlet aperture at its end and with the claw teeth depending from the end of the spout below this inlet aperture.

According to yet another aspect of the present invention there is provided a method of manufacturing a dispenser substantially as described above, said method characterised by the steps of:

i) forming said dispenser in a mold, said dispenser being molded in an open configuration, and ii) injecting pressurised gas into said mold, and iii) moving the dispenser from its open to unopened configuration under the action of the pressurised gas injected into said mold, and iv) removing the dispenser from the mold.

As can be appreciated by those skilled in the art the dispenser may be formed from a single piece of plastic with a mold. However, the projections or teeth required to form a dispenser claw create undercuts in the mold. Such undercuts make it difficult to remove the mold from around the newly formed dispenser without damaging the teeth as the mold is removed.

In a preferred embodiment air is injected into the mold at a pressure greater than atmospheric pressure. The injection of pressurised air into the mold places a turning force on the claw end of the dispenser spout formed in the open configuration. The spout will then be forced to pivot into its unopened position under the action of the pressurised air injected, moving the teeth of the claw out and away from the corresponding teeth forming elements of the mold. Once the claw's teeth are moved out of the way of the mold, the dispenser and mold may be separated from one another without fear of damaging the claw teeth.

In a preferred embodiment the inlet/claw end of the spout and front-end teeth of the claw are shaped with a substantially curved surface. The curve of this front surface may be of the same radius of curvature along the end of the spout and the front faces of the claws teeth. The use of the same radius of curvature in these components allow the faces of the pivoting spout and end claw projections to slide smoothly past the engaging face of the complimentary sections of the mould.

In a preferred embodiment the dispenser is formed from a single piece of molded plastic. Forming the dispenser in such a manner ensures that large numbers of dispensers may be easily and quickly produced from a single mold. The one-piece configuration of the dispenser also greatly reduces the complexity of the resulting device and the assembly time of a container that includes the dispenser.

However, in alternative embodiments the dispenser may be formed from two or more pieces of molded plastic. In such an embodiment relatively strong or hard plastic material may be required to form the teeth of the claw whereas relatively weak or flexible material may be required in the construction of a hinge element. However, it should be appreciated by those skilled in the art that the present invention may be formed using one, two or any number or separate components in accordance to the present invention.

The present invention provides a number of potential advantages over existing prior art devices.

A dispenser configured in accordance with the present invention may be used to easily dispense relatively viscous liquids in a tidy manner with use of its dispensing spout. The dispenser spout provides greater control over where a user dispenses liquid from the container.

The present invention allows a membrane seal of a container or a container cap to be easily and quickly pierced. The user of the liquids dispensed need not carefully open separate components of a container cap and peel off or pierce a membrane seal directly themselves. With the present invention the user need not fear splashing themselves with liquid from a container when they open it, and may easily and quickly rupture the seal of a container or container cap using the present invention.

It is an object of the present invention to address the foregoing problems or at least to provide the public with a useful choice.

Further aspects and advantages of the present invention will become apparent from the ensuing description that is given by way of example only.

BRIEF DESCRIPTION OF DRAWINGS

Further aspects of the present invention will become apparent from the following description that is given by way of example only and with reference to the accompanying drawings in which.

BEST MODES FOR CARRYING OUT THE INVENTION

Figure 1:
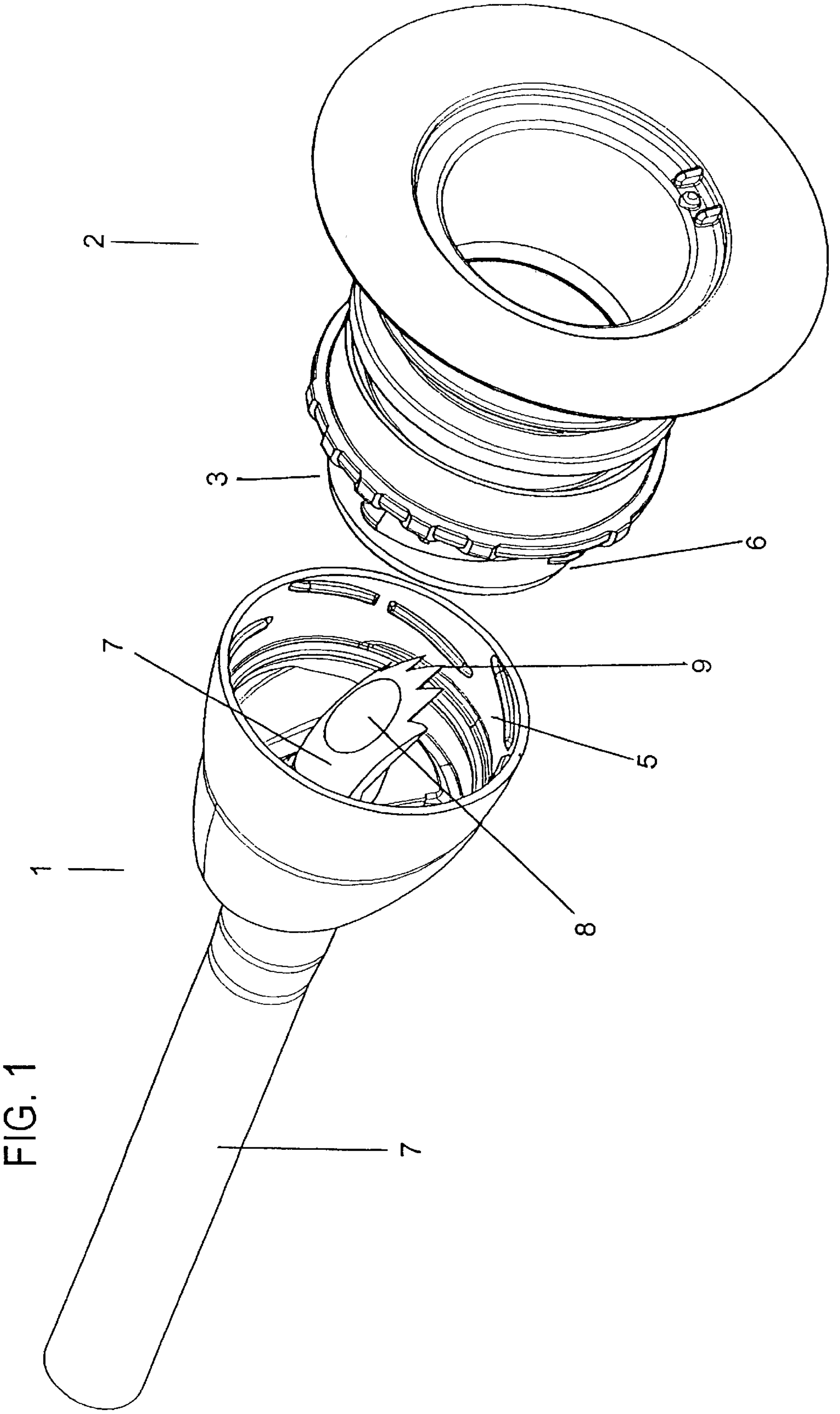
FIG. 1 illustrates a perspective view of a dispenser and a container cap configured in accordance with one aspect of the present invention.

FIG. 1 shows a dispenser 1 positioned adjacent to a container cap 2. The container cap 2 includes a membrane seal (not shown) at the top end 3 of the cap 2. The dispenser 1 is adapted to connect to the container cap 2 via a number of threads in an inner wall 5 of the dispenser 1 and the outer surface 6 of the cap 2.

The dispenser 1 also includes a spout 7 with an inlet hole 8 located adjacent to the cap membrane when the cap and dispenser are connected together.

The dispenser 1 also includes a claw 9 including a number of teeth formed into the bottom end or side of the spout 7.

Figure 2A:
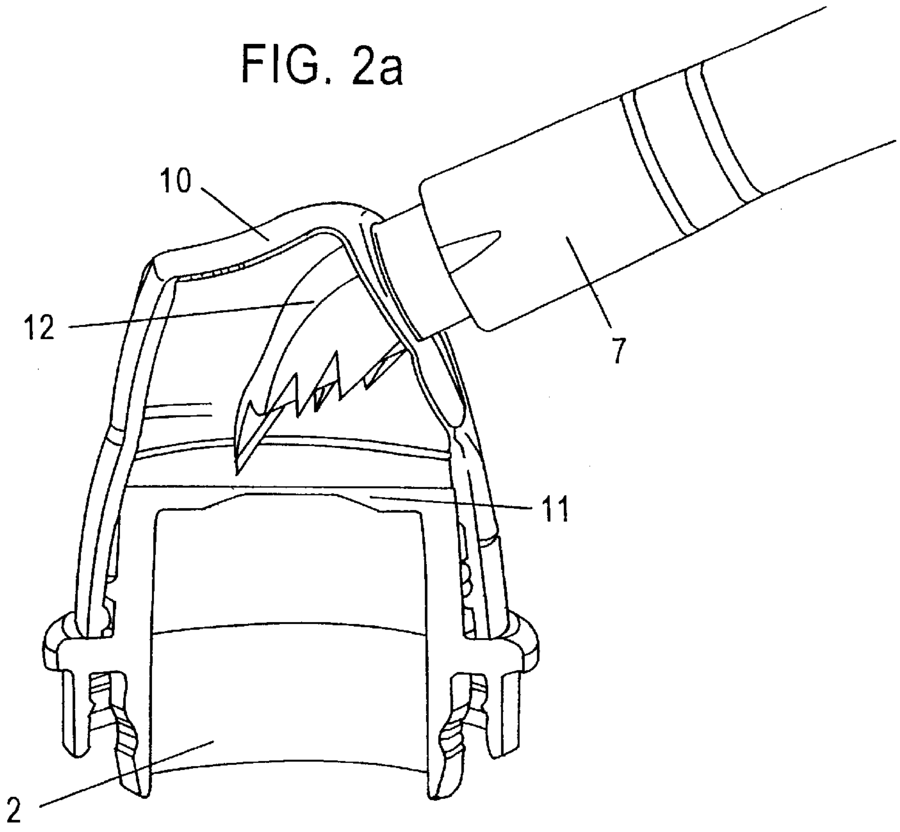
FIGS. 2*a,* 2*b* show a perspective view of a dispenser attached to a container cap, in both open and unopened configurations.

FIGS. 2*a,* 2*b* show the dispenser 1 and cap 2 of FIG. 1 connected together.

In FIG. 2*a* the dispenser is shown in its unopened configuration where the liquid channel formed by the spout 7 and cap 2 is closed by the cap membrane 11.

Figure 2B:
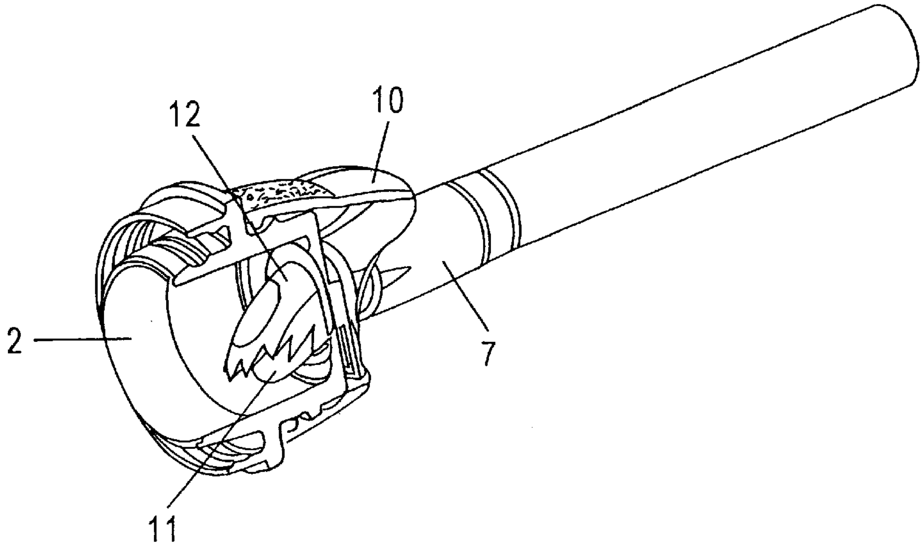

As can be seen from FIG. 2*b* the spout 7 is pivotally moveable into the open position to pierce the membrane 11 of the cap 2, creating an open liquid channel between the dispenser 1 and the cap 2. The spout 7 is pivoted between its unopened and open positions via the movement of a flexible hinging element 10 which connects the spout 7 into the main body of the dispenser 1.

The teeth of the claw 9 are adapted to pierce the membrane 11 and push it to one side of the dispenser 1, allowing liquid to flow freely to and through the aperture 8 on the end of the spout 7.

As can also be seen from FIGS. 1 and 2 the membrane-facing end of the spout 7 is formed into a curve with a constant radius of curvature from the top shoulder 12 of the spout down to the teeth of the claw. The constant radius of curvature used for these components allows the dispenser and spout firstly formed in the open position to be pivoted or moved into its closed position while still in the mold, thereby preventing the claws teeth being damaged when the mould is removed from the dispenser. The constant radius of curvature used allows these components to slide easily over the corresponding sections of the mould as the spout is pivoted into its unopened configuration.

Aspects of the present invention have been described by way of example only and it should be appreciated that modifications and additions may be made thereto without departing from the scope thereof as defined in the appended claims.

What we claim is:

1. A method of manufacturing a dispenser comprising the steps of:

forming the dispenser in a mould, the dispenser being moulded in an open configuration;

injecting pressurised gas into the mould;

moving at least a portion of the dispenser from a first configuration under the action of the pressurised gas injected into the mould; and removing the dispenser from the mould.

2. The method as claimed in claim 1 wherein the pressurized gas is at a pressure greater than atmospheric pressure.

3. The method as claimed in claim 1 wherein the dispenser includes projections forming a claw.

4. The method as claimed in claim 3 wherein the portion of the dispenser moved under the action of the pressurised gas is the claw.

5. The method as claimed in claim 3 wherein the dispenser is formed from two or more pieces of moulded plastic.

6. The method as claimed in claim 5 wherein the claw is formed from a stronger material than the remaining portion of the dispenser.

7. The method as claimed in claim 1 wherein the dispenser is formed from a single piece of moulded plastic.

8. A method of manufacturing a dispenser comprising the steps of:

forming the dispenser in a mould, wherein the dispenser is moulded in a first configuration; and injecting pressurized gas into the mould causing at least a portion of the dispenser to move from the first configuration to a second configuration.

9. The method as claimed in claim 8 further comprising the step of:

removing the dispenser from the mould.

10. The method as claimed in claim 8 wherein the first configuration is an open configuration.

11. The method as claimed in claim 8 wherein the second configuration is a closed configuration.

12. The method as claimed in claim 8 wherein the pressurized gas is at a pressure greater than atmospheric pressure.

13. The method as claimed in claim 8 wherein the dispenser includes projections forming a claw.

14. The method as claimed in claim 8 wherein the portion of the dispenser moved under the action of the pressurised gas is the claw.

15. The method as claimed in claim 8 wherein the dispenser is formed from a single piece of moulded plastic.

16. The method as claimed in claim 8 wherein the dispenser is formed from two or more pieces of moulded plastic.

17. The method as claimed in claim 16 wherein the claw is formed from a stronger material than the remaining portion of the dispenser.

* * * * *